United States Patent [19]
Bonola

[11] Patent Number: 5,913,058
[45] Date of Patent: Jun. 15, 1999

[54] SYSTEM AND METHOD FOR USING A REAL MODE BIOS INTERFACE TO READ PHYSICAL DISK SECTORS AFTER THE OPERATING SYSTEM HAS LOADED AND BEFORE THE OPERATING SYSTEM DEVICE DRIVERS HAVE LOADED

[75] Inventor: Thomas J. Bonola, Tomball, Tex.

[73] Assignee: Compaq Computer Corp.

[21] Appl. No.: 08/941,623

[22] Filed: Sep. 30, 1997

[51] Int. Cl.$^6$ .............................. G06F 9/06; G06F 13/00
[52] U.S. Cl. ............................ 395/652; 395/821
[58] Field of Search .................... 395/651, 652, 395/653, 712, 200.5, 200.52, 200.51

[56] References Cited

U.S. PATENT DOCUMENTS

| | | | |
|---|---|---|---|
| 5,291,585 | 3/1994 | Sato et al. ............................... | 395/500 |
| 5,388,267 | 2/1995 | Chan et al. .............................. | 395/652 |
| 5,694,583 | 12/1997 | Williams et al. ........................ | 395/500 |
| 5,706,514 | 1/1998 | Bonola .................................... | 395/674 |
| 5,748,980 | 5/1998 | Lipe et al. ............................... | 395/828 |

*Primary Examiner*—Kevin A. Kriess
*Attorney, Agent, or Firm*—Kevin L. Daffer; Conley, Rose & Tayon

[57] ABSTRACT

A system and method for using real mode BIOS calls to load an executable program for execution on a dedicated I/O processor before device drivers which communicate with the I/O processor have been loaded by an operating system. In the preferred embodiment, the system comprises a plurality of x86 processors coupled to a system memory. One of the x86 processors is designated as a dedicated I/O processor. A storage device stores an operating system for execution on the remaining processors, an executable program for executing on the dedicated I/O processor, such as a real-time kernel, and a device driver which is operable to execute on the remaining processors and to communicate with the real-time kernel executing on the I/O processor to perform I/o operations on an I/O device. The storage device also stores a loader program which is loaded by the operating system executing on a first of the remaining processors early in the process of booting the operating system. The loader program executing on the first processor creates a real mode interface in order to switch the first processor to real mode so that a real mode code portion of the loader can execute BIOS INT13 disk requests to read the real-time kernel from the storage device. Creating the real mode interface comprises saving the protected mode state of the first processor and of the system's interrupt control logic. After saving the states of the first processor and interrupt control logic, the loader program programs the interrupt control logic to simulate a real mode environment. The loader program also provides a "tiled mapping" of memory addresses such that the transition may be made from real mode to protected mode and vice versa to facilitate the x86 processor real mode and protected mode physical address computation differences.

29 Claims, 6 Drawing Sheets

SYSTEM AND METHOD FOR USING A REAL MODE BIOS INTERFACE TO READ PHYSICAL DISK SECTORS AFTER THE OPERATING SYSTEM HAS LOADED AND BEFORE THE OPERATING SYSTEM DEVICE DRIVERS HAVE LOADED

BACKGROUND OF THE INVENTION

1. Field of the Invention

This invention relates to multiprocessor computer systems, and in particular to dedicated input/output (I/O) processors in computer systems.

2. Description of the Related Art

Multiprocessor computer systems have become commonplace. For example, many personal computers which comprise a plurality of Intel Pentium® or Pentium-class processors are available in the marketplace. These multiprocessor systems are largely employed in network server environments which require large amounts of input/output (I/O). For example, many mass storage I/O operations and/or network I/O operations must be performed in network server systems. The I/O operations involve the transfer of data between I/O devices and system memory. An operating system, in particular device drivers, executing on the system processors programs the I/O devices to perform the I/O operations. Furthermore, the device drivers of the operating system executing on the system processors perform other I/O-related functions such as servicing interrupts generated by the I/O devices.

In many cases, the I/O processing performed by the system processors, particularly interrupt servicing and accessing registers within the I/O devices across an I/O bus to which the I/O devices are coupled, constitute a large processing bandwidth burden on the system processors. Hence, a trend toward dedicated I/O processors to offload the system processors has appeared. An example of a contemporary architecture which employs I/O processors to offload I/O processing functions from system processors is the Intelligent I/O ($I^2O$) architecture. The $I^2O$ standard is described in the $I^2O$ Architecture Specification, Draft Revision 1.5, March 1997, which is hereby incorporated by reference in its entirety. The $I^2O$ architecture is independent of operating system, processor platform, and system I/O bus. The specification provides a means for migrating large portions of device drivers from the system processors to the dedicated I/O processors. According to this architecture, the portions of the device driver which remain in the host operating system are relatively small, portable and easily maintained.

The $I^2O$ architecture provides a real-time kernel which executes on an I/O processor which controls one or more I/O devices. Portions of the device drivers for the I/O devices from the host operating system are adapted and migrated to execute on the I/O processor in conjunction with the real-time kernel. The architecture specifies an interface for host operating system device drivers to communicate with the I/O device drivers executing on the I/O processors across and I/O bus to which the I/O devices are coupled.

One approach to a dedicated I/O processor architecture has been disclosed in U.S. patent application Ser. No. 09/152,997 entitled Method and System for Implementing Intelligent Distribution Input/Output Processing in a Multi-Processor Computer System (P-1359) which was filed on Sep. 14, 1998, whose inventor is Thomas J. Bonola, which is assigned to Compaq Computer Corporation, and which is hereby incorporated by reference in its entirety as though fully set forth herein. The referenced patent application describes a method for dedicating one of the system processors, such as a Pentium processor in a multiprocessor system, to perform the functions of an $I^2O$ processor. That is, the dedicated I/O system processor executes the $I^2O$ real-time kernel, which is dissimilar from the host operating system executing on the remaining system processors. The dedicated I/O system processor also executes those portions of the device drivers which are migrated to the I/O processor. The dedicated I/O system processor essentially emulates the hardware interface specified for $I^2O$ devices using system memory rather than actual hardware FIFOs. Thus, in at least one example, it is desirable to execute a software program dissimilar from the host operating system on one of the multiple processors in a multiprocessor system.

A pertinent characteristic of x86 processors is that they are capable of running in mixed modes, namely real mode and protected mode, as is well known in the art of programming x86 processors. The fact that the system processors initially run in real mode but eventually are typically switched to run in protected mode by the host operating system, such as Windows NT or UNIX, poses some problems. Typically, the host operating system is loaded from a non-volatile storage device, such as a disk drive. The operating system is loaded from the disk drive by some operating system independent means, such as using Basic Input/Output System (BIOS) disk service calls, e.g., INT13H calls, while in real mode. Device drivers are also loaded and after switching to protected mode, the device drivers access their associated I/O devices. However, if one of the system processors is to serve as a dedicated I/O processor in the system, programs such as the real-time kernel which executes on the dedicated I/O system processor must be loaded into system memory and executed on the dedicated I/O system processor prior to the time when the device driver executing on the host system processors attempts to access the dedicated I/O system processor. Thus, a system and method is desired for loading an executable program from a non-volatile storage device after the host operating system has been loaded but prior to execution of the host operating system device drivers.

SUMMARY OF THE INVENTION

The problems outlined above are in large part solved by the system and method of the present invention for using real mode BIOS calls to load an executable program for execution on a dedicated I/O processor before device drivers which communicate with the I/O processor have been loaded by an operating system. In the preferred embodiment, the system comprises a plurality of x86 processors coupled to a system memory. One of the x86 processors is designated as a dedicated I/O processor. The system further comprises a storage device, such as a disk drive. The storage device stores an operating system for execution on the remaining processors. The storage device also stores an executable program for executing on the dedicated I/O processor, such as a real-time kernel. The storage device also stores a device driver which is part of the operating system and which is operable to execute on the remaining processors and to communicate with the real-time kernel executing on the I/O processor to perform I/O operations on an I/O device comprised in the system.

The storage device also stores a loader program, preferably a device driver, which is loaded by the operating system executing on a first of the remaining processors early in the process of booting the operating system. Preferably, the loader program is loaded as the first device driver. The loader program executing on the first processor creates a real mode interface in order to switch the first processor to real mode. The loader program includes real mode code which executes BIOS INT13 disk requests to read sectors of the real-time kernel from the storage device. Once the first processor is switched to real mode, the real mode code of the loader program reads the real-time kernel from the storage device into system memory using BIOS INT13 calls.

After the loader program loads the real-time kernel into system memory, the loader program causes the I/O processor to execute the real-time kernel. Once the real-time kernel is ready to receive communications from the host operating system, the loader program returns control back to the host operating system. The operating system loads the device driver which communicates with the real-time kernel executing on the I/O processor to perform I/O operations on the I/O device. Thus, the loader program enables the real-time kernel to be loaded into system memory and executed on the I/O processor prior to the host operating system loading the device driver which communicates with the real-time kernel executing on the I/O processor.

The loader program performs various steps to enable to the real-time kernel to be loaded via real mode INT13 calls. The loader must allocate a chunk of real mode addressable (i.e. below 1 MB) system memory in order to execute real mode code. A portion of the real mode code executes on the first processor to issue INT13 calls. A portion of the real mode code executes on the I/O processor when the I/O processor comes out of reset and transfers control to the real-time kernel to execute on the I/O processor. The real mode addressable chunk of memory is also used as a sector buffer by the BIOS INT13 real mode code to read in sectors from the storage device.

Creating the real mode interface comprises saving the protected mode state of the first processor which was set by the host operating system so that the protected mode state may be restored when the first processor is switched back to real mode after the INT13 reads are performed. In particular, the protected mode memory mapping information, e.g., segment registers and segment descriptor tables, must be saved since they will be altered prior to switching to real mode. Creating the real mode interface also comprises saving the state of interrupt control logic comprised in the system. In one embodiment, the interrupt control logic comprises local interrupt controllers in each of the processors, a multiprocessor-capable I/O interrupt controller, and traditional PC-architecture 8259 peripheral interrupt controllers.

After saving the states of the first processor and interrupt control logic, the loader program programs the interrupt control logic to simulate a DOS environment. The loader program also provides a "tiled mapping" of memory addresses such that the transition may be made from real mode to protected mode and vice versa. This is necessary since x86 processors compute physical addresses differently in real mode and protected mode.

Broadly speaking, the computer system of the present invention comprises a plurality of processors, a system memory, and a storage device having a software program stored thereon, wherein a first of the processors may operate in both real mode and protected mode and a second of the processors may operate in real mode. The invention comprises a method for loading the program into the system memory for execution on the second processor, wherein, the method comprises executing a portion of an operating system in protected mode on the first processor, switching the first processor from protected mode into real mode, reading the program from the storage device into the system memory while the first processor is in real mode, and switching the first processor back from real mode into protected mode after the reading the program.

BRIEF DESCRIPTION OF THE DRAWINGS

Other objects and advantages of the invention will become apparent upon reading the following detailed description and upon reference to the accompanying drawings in which.

Figure 1:
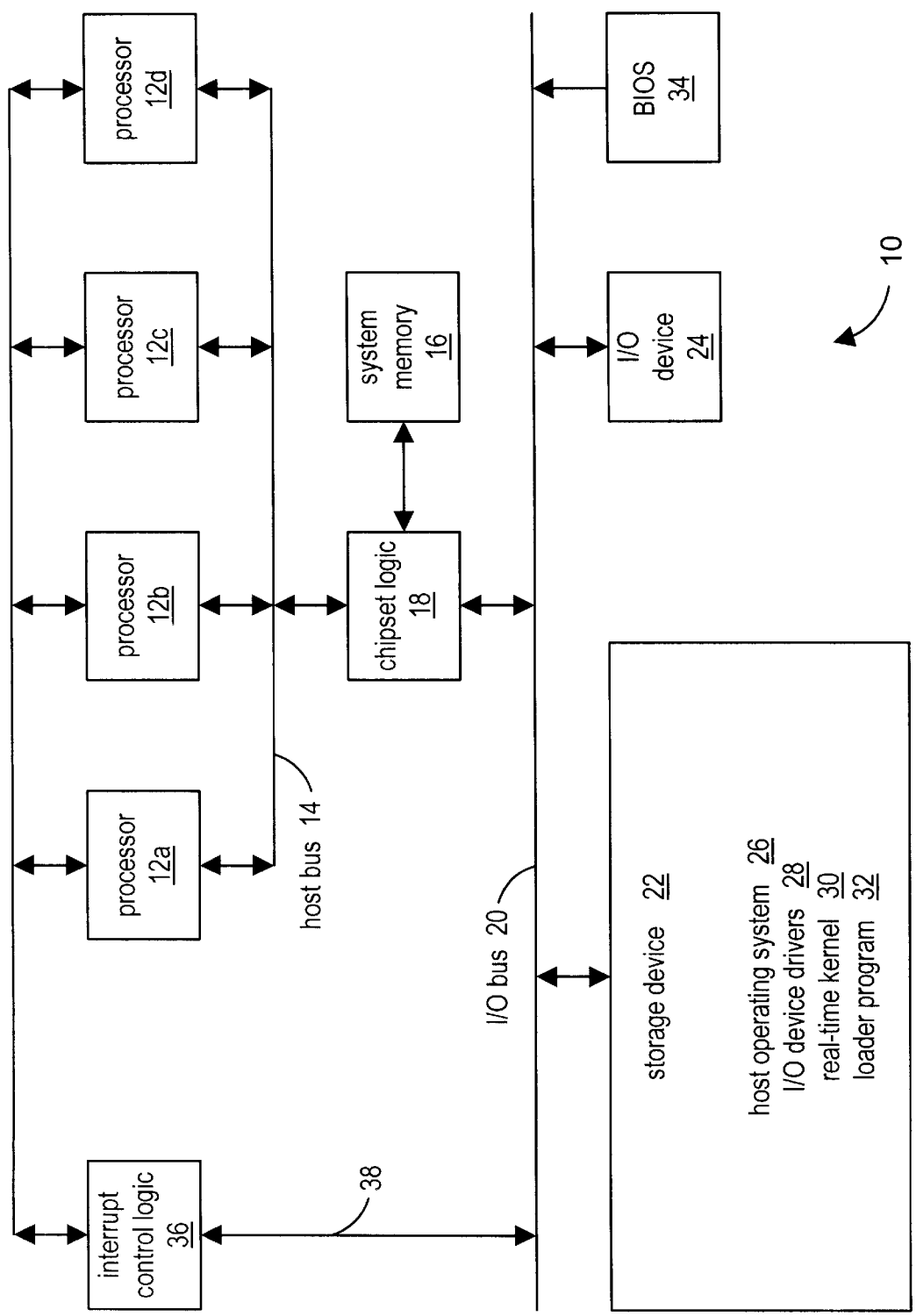
FIG. 1 is a block diagram of a multiprocessor computer system according to the preferred embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring to FIG. 1, a block diagram of a multiprocessor computer system 10 is shown. The shown 10 comprises a plurality of system processors 12a–12d coupled to a processor bus 14. Processor 12d operates as a dedicated I/O processor. Processors 12a, 12b and 12c execute a host operating system, such as Windows NT or UNIX. For simplicity and clarity, processor 12d will be referred to as the I/O processor 12d and processors 12a, 12b and 12c will be referred to as host processors 12a–c. In the preferred embodiment, the processors 12a–12d are x86 processors such as Pentium processors. In one embodiment, the host processors 12a–c operate as symmetric multiprocessors. The system 10 further includes one or more I/O deices 24, preferably coupled to an I/O bus 20. The I/O devices 24 are controlled by the I/O processor 12d.

The processors 12a–d are also coupled to a system memory 16, preferably via chipset logic 18, which includes a memory controller. The system memory 16 is accessible by each of the processors 12a–d. In one embodiment, the chipset logic 18 further includes an I/O bus bridge for coupling the processor bus 14 to the I/O bus 20. In one embodiment, the I/O bus 20 is a PCI bus.

The system 10 further includes a non-volatile storage device 22, such as a disk drive, preferably coupled to the I/O bus 20. Stored on the storage device 22 is the host operating system 26. The host operating system 26 is loaded from the storage device 22 into the system memory 16 at boot time and executed on the host processors 12a–c. The storage device 22 further includes device drivers 28. The device drivers 28 also execute on the host processors 12a–c. The device drivers 28 communicate with the I/O processor 12d to request I/O operations of the I/O devices 24.

The storage device 22 further includes an real-time operating system 30, or kernel, which is loaded from the storage device 22 into the system memory 16 for execution on the I/O processor 12d. Preferably, the device drivers 28 and the real-time kernel 30 executing on the I/O processor 12d communicate via a shared region of the system memory 16. The present invention advantageously provides a method for loading the real-time kernel 30 from the storage device 22 into memory 16 after the host operating system 26 has been loaded into memory 16 and before the device drivers 28 have been loaded into memory 16. In particular, the real-time kernel 30 is loaded and executed on the I/O processor 12d prior to the device drivers 28 making requests of the I/O processor 12d. The real-time kernel 30 is loaded by a loader program 32, preferably stored on the storage device 22. In the preferred embodiment, the loader 32 is a device driver which is loaded by the operating system before the device drivers 28 which communicate with the I/O processor 12d. In one embodiment, the storage device 22 is one of the I/O devices 24 which may be controlled by the I/O processor 12d. In one embodiment, the real-time kernel 30 comprises an $I^2O$ real-time kernel compiled for an x86 processor, i.e., compiled to execute on the I/O processor 12d and migrated portions of device drivers for the I/O device 24.

Although an embodiment is described in which the real-time kernel 30 is executed on the I/O processor 12d, the present invention is advantageous for loading any software program onto the I/O processor 12d which must be loaded after the operating system and before device drivers. In other embodiments, hardware devices other than an $I^2O$ device are emulated. In particular, the present system and method is useful for emulating new I/O device hardware prior to the development of the hardware so that device driver software may be developed for the new hardware before the new hardware is available. Examples of other I/O device hardware include video controllers and network interface controllers.

The system 10 further includes a Basic Input/Output System (BIOS) 34 comprised in a non-volatile memory, such as an EPROM or FLASH memory. In one embodiment, the BIOS 34 is coupled to the host bus 14. In one embodiment, the BIOS 34 is coupled to the I/O bus 20 or an ancillary I/O bus, such as an Industry Standard Architecture (ISA) bus, bridged to the I/O bus 20. BIOS 34 programs are well known in the art of IBM®-compatible personal computers.

In particular, the BIOS 34 includes disk services accessible via a disk services entry point via real mode software interrupt 13H (commonly referred to as INT13), as is also well known in the art of personal computers. The BIOS 34 disk services routines are operable to read and write specified sectors of data from a specified storage device, such as storage device 22, while the processor executing the BIOS program is in real mode. In one embodiment, the BIOS 34 disk services routines which communicate with the storage device 22 are comprised in a non-volatile memory comprised in the storage device 22. Such a BIOS on a peripheral device is commonly referred to as an "option ROM." For a disk storage device, the option ROM includes an INT13 entry point which replaces a previous software interrupt 13 entry in an interrupt vector table of the first processor 12a. Consequently, the option ROM entry point is vectored to in response to the execution of an INT13 instruction by the first processor 12a. More about the operation of the BIOS 34, and in particular INT13 disk services, will be described below.

The system 10 further comprises interrupt control logic 36 coupled to the processors 12a–d. Preferably, the interrupt control logic 36 comprises an I/O Advanced Programmable Interrupt Controller (IOAPIC), master and slave 8259A Peripheral Interrupt Controllers (PICs), and a local Advanced Programmable Interrupt Controller (APIC) associated with each of the processors 12a–d. In one embodiment, the local APICs are comprised within the processors 12a–d. The interrupt control logic 36 logic receives interrupt request signals 38 from various interrupt sources in the system 10, such as the I/O device 24, and controls the routing of the interrupt request signals 38 to the processors 12a–d. Preferably, the interrupt control logic 36 comprises interrupt control logic external to the processors 12a–d as well as interrupt control logic integrated in each of the processors 12a–d, as will be described in more detail with respect to FIG. 5.

Figure 2:
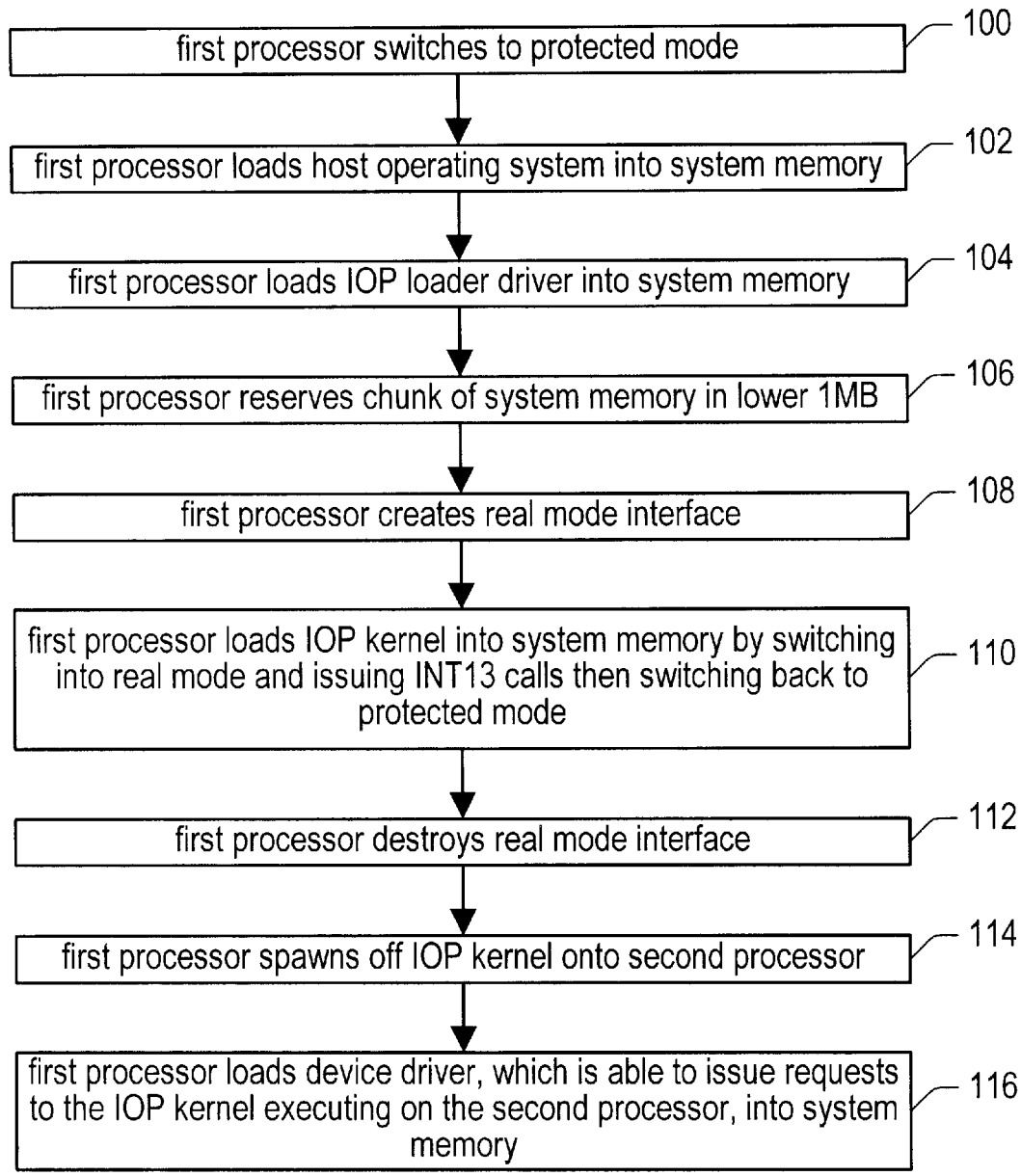
FIG. 2 is a flowchart illustrating steps performed to load the real-time kernel of FIG. 1 from the storage device of FIG. 1 into the system memory of FIG. 1 for execution on the I/O processor of FIG. 1.

Referring now to FIG. 2, a flowchart is shown illustrating steps performed to load the real-time kernel 30 from the storage device 22 into the system memory 16 for execution on the I/O processor 12d. For clarity and simplicity a first of the host processors 12a–c will be designated in the description following as the "first processor 12a", indicating the processor which loads the real-time kernel 30 into the system memory 16. It is noted that preferably, any of the host processors 12a–c may be used to load the real-time kernel 30.

As described earlier, in the preferred embodiment, the processors 12a–d are x86 processors. Preferably, the x86 processors are of the 80386 class of x86 processor or subsequent processors of the x86 architecture processors, such as the 80486 class, Pentium class and Pentium Pro class. In particular, the processors 12a–d are capable of operating in either of at least two modes: real mode and protected mode. Real mode and protected mode operation of x86 processors is well known in the art of programming x86 processors. However, a brief discussion of pertinent aspects of real and protected mode operation will be given here.

One pertinent limitation of an x86 processor operating in real mode is the processor is only capable of addressing 1 MB of physical memory. Thus, in a system such as system 10, if the system memory 16 includes more than 1 MB of memory, the processor cannot address the memory above 1 MB when operating in real mode. Another pertinent limitation of x86 processor-based personal computers is that the BIOS routines, in particular the software interrupt 13H disk service routines, are typically written to execute in real mode. However, although the INT13 disk services are limited to real mode execution, they advantageously provide an operating system independent means of performing disk I/O. That is, the INT13 disk services provide an "operating system device driver-less" means of performing disk I/O.

Conversely, in protected mode, an x86 processor is capable of addressing 4 GB of physical memory. In addition, many operating systems, such as Windows NT, UNIX and Novell NetWare®, operate in protected mode in order to take advantage of the memory protection capabilities offered by x86 processors in protected mode. Another difference between real and protected mode operation of x86 processors is the manner in which segment registers are used to perform segmentation of memory. As is well known in the art of programming x86 processors, in real mode the segment registers are used to specify memory segments, whereas in protected mode the segment registers are used to specify descriptors of memory segments.

Description is made below of one embodiment of the present invention executing in the Windows NT operating system and is operable to load an image from a storage device having a DOS FAT file system. However, it will be obvious to one skilled in the art of device driver development in light of the present disclosure to adapt the method disclosed to other operating systems and other file systems.

During the boot process of the host operating system 26, the first processor 12a switches to protected mode, in step 100. The first processor 12a then loads the host operating system 26 from the storage device 22 into system memory 16, in step 102 and transfers control to the host operating system 26. In one embodiment, the host operating system 26 is loaded into system memory 16 and then the first processor 12a is switched into protected mode.

In one embodiment, only a portion of the host operating system 26 is loaded into memory 16. Preferably, the kernel portion of the host operating system 26 is loaded into memory 16. The kernel portion is intended to distinguish the device driver portions of the host operating system 26 from the remainder of the host operating system 26. That is, preferably the kernel portion does not include the device drivers of the host operating system 26. Preferably, the first processor 12a switches into protected mode prior to loading the host operating system 26 kernel into system memory 16 so that portions of the host operating system 26 may be loaded into system memory 16 ranges above the real mode memory addressability range, i.e., above 1 MB. However, in one embodiment, when control is transferred to the host operating system 26, the host operating system 26 switches the first processor 12a to protected mode.

Next, the first processor 12a loads the loader program 32 from the storage device into system memory 16, in step 104, and transfers control to the loader program 32. In one embodiment, the loader program 32 is a device driver, such as a Windows NT device driver. Transferring control comprises executing an initialization routine of the loader program 32 driver. In one embodiment, the host operating system 26 kernel is configured to load the loader program 32 as the first device driver, i.e., prior to any other device drivers in the system. Preferably, during installation of the loader program 32 device driver, a Windows Registry is updated to request the loader program 32 driver to be loaded as the first device driver by the host operating system 26. Loading the loader program 32 driver first minimizes the possibility that all of the lower 1 MB of memory is consumed before the loader program 32 driver initialization routine is executed. In another embodiment, the loader program 32 and the device drivers are comprised within the host operating system 26 and are loaded along with the host operating system 26 in step 102. However, in this embodiment, the initialization routine of the loader program 32 device driver is executed prior to execution of the initialization routines of any of the other device drivers in the host operating system 26.

The loader program 32, operating on the first processor 12a, "locks down", i.e., allocates or reserves, a chunk of system memory 16 in the lower 1 MB, in step 106. That is, the loader program 32 reserves a chunk of system memory 16 which is addressable by the processors 12a–d in real mode. In a subsequent step, the loader program 32 will copy real mode code portions of itself into this reserved chunk of memory. The real mode code comprises a portion for execution by the first processor 12a in real mode and a portion for execution by the I/O processor 12d in real mode. Furthermore, a portion of the reserved memory chunk in real mode addressable memory is used as a sector buffer for the BIOS INT13 routine to read sectors into from the storage device 22.

In step 108, The loader program 32, operating on the first processor 12a, creates a real mode interface to enable itself to load the real-time kernel 30, using BIOS 34 INT13 calls, into system memory 16 for execution on the I/O processor 12d. Step 108 will be described in detail with regard to FIG. 4 below. Among other things, creating a real mode interface includes saving the state of the first processor 12a and interrupt control logic 36; programming the interrupt control logic 36 for real mode operation; disabling the real-time system clock interrupt; and, providing a memory mapping between protected mode and real mode.

In step 110, the loader program 32 loads the real-time kernel 30 into system memory 16 by switching to real mode, issuing BIOS 34 INT13 calls, and switching back to protected mode. Step 110 will be described now in detail with reference to FIG. 3.

Figure 3:
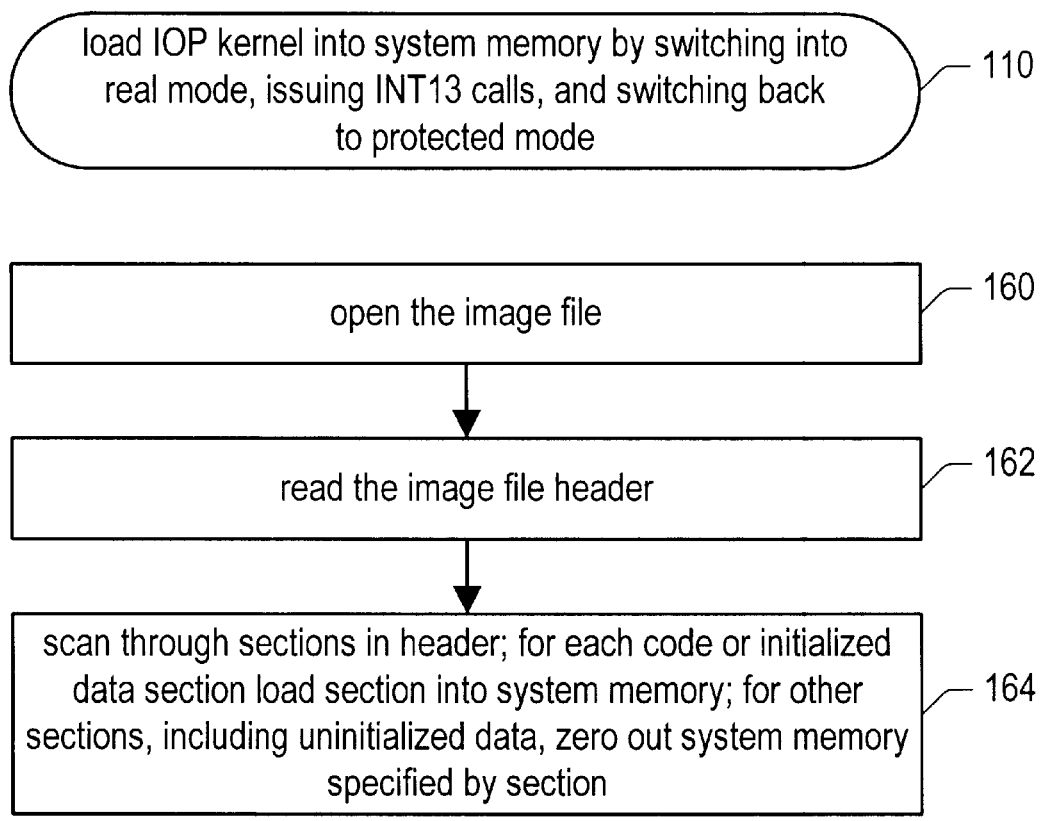
FIG. 3 is a flowchart illustrating steps performed to load the real-time kernel of FIG. 1 from the storage device of FIG. 1 into the system memory of FIG. 1 by switching into real mode, issuing INT13 calls, and switching back to protected mode.

Referring now to FIG. 3, a flow chart is shown illustrating steps performed to load the real-time kernel 30 from the storage device 22 into the system memory 16 by switching into real mode, issuing INT13 calls, and switching back to protected mode. Preferably, the real-time kernel 30 is comprised within an executable image file, also referred to as an image file, in a file system on the storage device 22. In step 160, the first processor 12a opens the image file, i.e., the file including the real-time kernel 30.

Preferably, opening the real-time kernel 30 file comprises reading the master boot record of the storage device 22 and scanning the partition table looking for a bootable partition of the desired file system type, such as a DOS FAT partition. Opening the real-time kernel 30 file further comprises determining storage device 22 parameters, and file system data structure information, such as FAT root directory information and file data area information. Opening the real-time kernel 30 file further comprises searching the file system directory to determine the location in the file system of the real-time kernel 30 file.

In order to perform the reads necessary to open the real-time kernel 30 file, the first processor 12a switches to real mode, issues an INT13 call, and switches back to protected mode. Preferably, the real mode addressable sector buffer is passed as the destination address parameter to the INT13 calls for reading the required sectors from the storage device 22 such as the master boot record and file system data structure information. Preferably, the first processor 12a copies the data read from the storage device 22 into the real mode addressable sector buffer to the desired location in system memory 16, which may be outside of the real mode addressable range. Preferably, the first processor 12a computes INT13 parameters, such as sector counts and starting head, cylinder and sector values from logical sector information of the file data area information and from the storage device 22 parameters previously obtained. The code which executes the INT13 calls comprises portions of the loader program 32 which execute in real mode on the first processor 12a. This code is copied to the chunk of system memory 16 which was reserved in step 106.

Preferably, the executable image file comprises a header portion which specifies various sections of the executable image comprised therein, such as code sections, initialized data sections and uninitialized data sections. Executable image file formats are well known in the art of computer programming. The first processor 12a reads the image file header, in step 162.

In step 164, the first processor 12a scans the header looking at the description of each section to determine the type of section. For each section which is a code section or an initialized data section, the first processor 12a loads the section from the image file on the storage device 22 into system memory 16 using address information specified in the section descriptions in the header. Loading the sections comprises switching the first processor 12a to real mode, issuing an INT13 call, and switching the first processor 12a back to protected mode. The code which executes the INT13 calls comprises portions of the loader program 32 which execute in real mode on the first processor 12a. This code is copied to the chunk of system memory 16 which was reserved in step 106.

Preferably, the real mode addressable sector buffer is passed as the destination address parameter to the INT13 call for reading the sectors from the storage device 22 which include the executable image sections of the real-time kernel 30 file. Preferably, the first processor 12a copies the data read from the storage device 22 into the real mode addressable sector buffer to the desired location in system memory 16, which may be outside of the real mode addressable range. Preferably, the first processor 12a computes INT13 parameters, such as sector counts and starting head, cylinder and sector values from logical sector information of the file data area information and from the storage device 22 parameters previously obtained. For each other section, including uninitialized data sections, the first processor 12a clears, i.e., fills with zeros, the system memory 16 locations specified in the header section descriptions. Thus, multiple switches between real and protected mode are performed by the loader program 32 to load the real-time kernel 30.

Thus, the loader program 32 loads the real-time kernel 30 using operating system independent INT13 calls. This is advantageous in that the real-time kernel 30 may be executed on the I/O processor 12d prior to the host operating system 26 loading a device driver 28 which will try to communicate with the real-time kernel 30 executing on the I/O processor 12d to control the I/O device 24.

Referring again to FIG. 2, after loading the real-time kernel 30 into system memory 16, the first processor 12a destroys the real mode interface, in step 112. Step 112 will be described in detail with regard to FIG. 6 below.

Once the real-time kernel 30 has been loaded into system memory 16, the first processor 12a spawns off the real-time kernel 30 onto the I/O processor 12d, in step 114. That is, the first processor 12a causes the I/O processor 12d to begin executing the real-time kernel 30. Preferably, spawning off the real-time kernel 30 onto the I/O processor 12d comprises the first processor 12a causing the I/O processor 12d to execute a startup program when the I/O processor 12d comes out of reset. The startup program comprises portions of the loader program 32 which execute in real mode on the I/O processor 12d after the I/O processor 12d comes out of reset. The startup program is copied to the chunk of system memory 16 which was reserved in step 106.

The startup program, executing on the I/O processor 12d in real mode after coming out of reset, initializes the I/O processor 12d environment, switches the I/O processor 12d to protected mode, and transfers execution to the real-time kernel 30. Thus, the I/O processor 12d is now capable of receiving requests from the host processors 12a–c to perform I/O operations on the I/O device 24.

After spawning the real-time kernel 30 on the I/O processor 12d and being notified by the real-time kernel 30 that the real-time kernel 30 has completed its initialization, the loader program 32 returns control back to the host operating system 26. The host operating system 26 loads other device drivers into system memory 16. In particular, the host operating system 26 loads the device driver 28 which communicates with the real-time kernel 30 executing on the I/O processor 12d to effectuate I/O operations on the I/O device 24, in step 116. Thus, the flowchart of FIG. 2 illustrates a method for using real mode BIOS INT13 calls to load an executable image into system memory for execution on a second processor after the operating system has loaded and before device drivers have been loaded which communicate with the executable image executing on the second processor.

Figure 4:
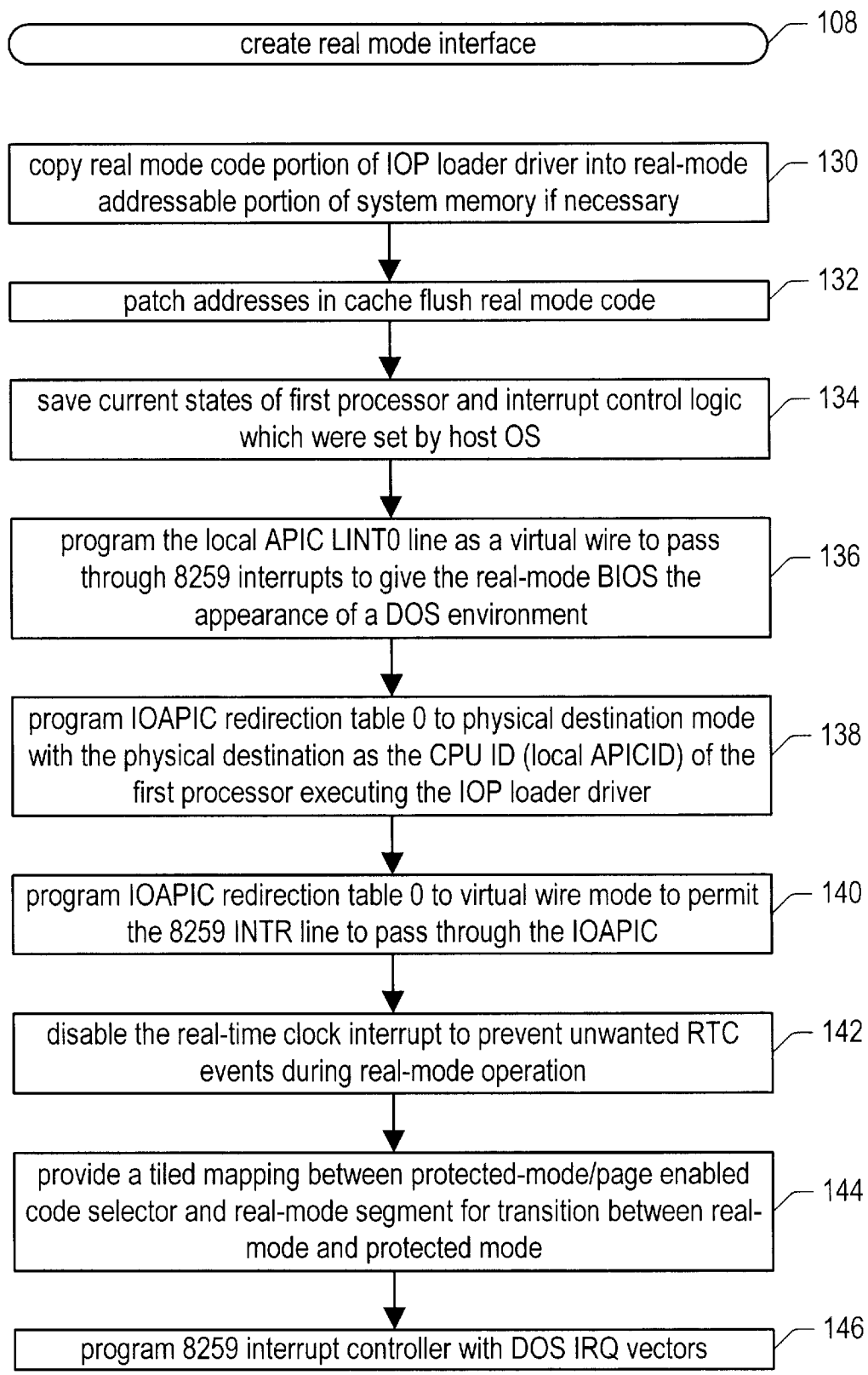
FIG. 4 is a flowchart illustrating in more detail the step of creating the real mode interface of FIG. 2.

Referring now to FIG. 4, a flowchart illustrating in more detail step 108 of FIG. 2, creating the real mode interface, is shown. The portions of the loader program 32 which execute in real mode on the first processor 12a and the I/O processor 12d and the sector buffer must reside in a real mode addressable portion of system memory 16. Therefore, if the host operating system 26 loaded the real mode portion of the loader program 32 into a region of system memory 16 which is not addressable in real mode, the loader program 32 allocates a chunk of real mode addressable system memory 16, and copies the real mode code to the allocated chunk of system memory 16, in step 130.

It is necessary for the first processor 12a to cause a reload of the Code Segment (CS) register and a flush of a pre-fetch instruction queue comprised in the first processor 12a when switching between real mode and protected mode or vice versa. Therefore, the real mode code portion of the loader program 32 comprises instructions which perform an inter-segment jump immediately following the instructions which switch the first processor 12a between real mode and protected mode. These instructions must be patched with the appropriate destination address of the jump instruction. The loader program 32 patches the addresses of the real mode code portions which perform the flushing, in step 132.

The loader program 32 saves the protected mode state of the first processor 12a and of the interrupt control logic 36 which were set by the host operating system 26, in step 134. In particular, the loader program 32 saves the state of the x86 global descriptor table (GDT), since the loader program 32 will modify the GDT in a subsequent step.

Figure 5:
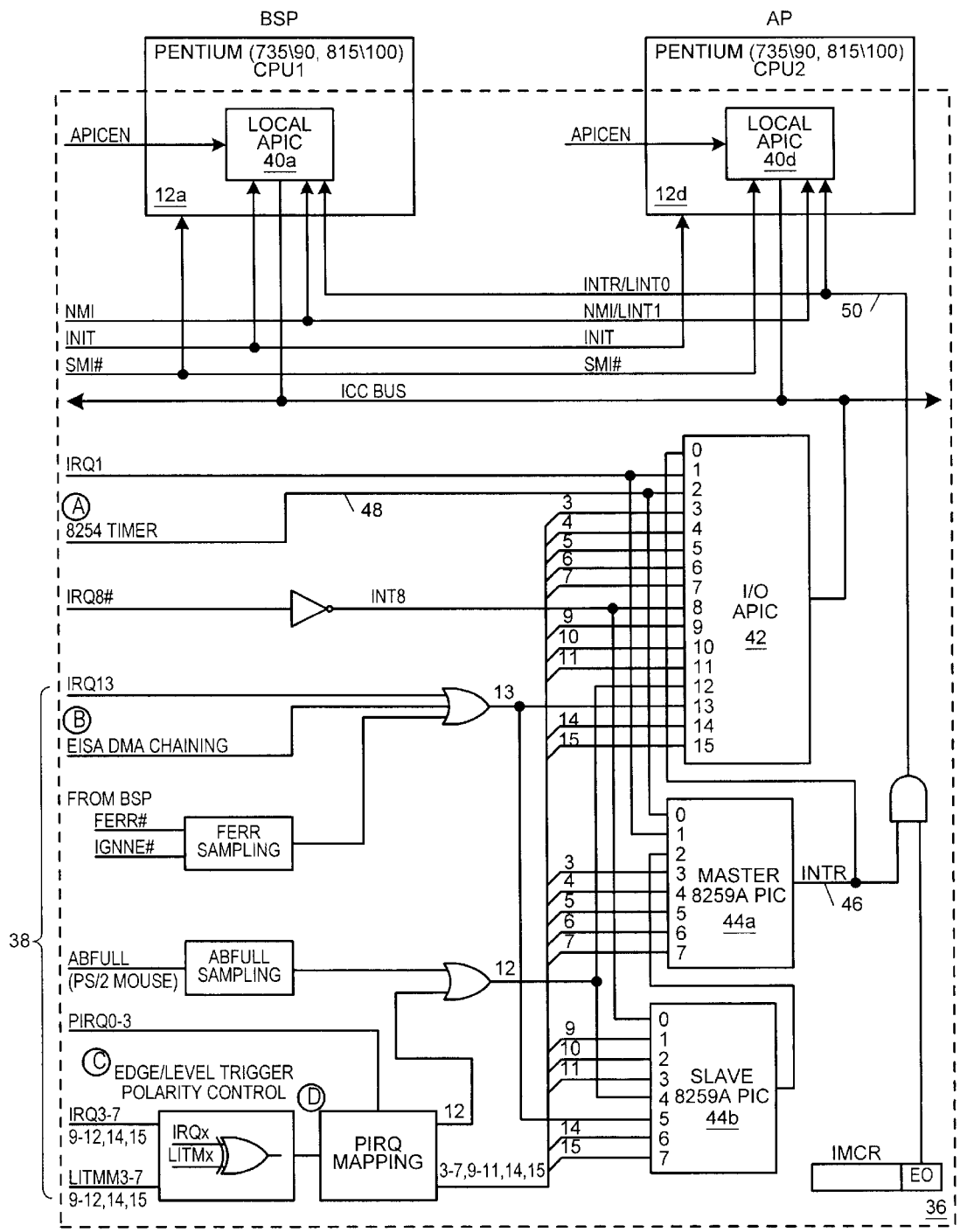
FIG. 5 is a block diagram illustrating in more detail the interrupt control logic of the system of FIG. 1.

Referring now to FIG. 5, a block diagram illustrating in more detail the interrupt control logic 36 in the preferred embodiment of the system 10 is shown. The interrupt control logic 36 comprises a local Advanced Programmable Interrupt Controller (APIC) 40a comprised within processor 12a and a local APIC 40d comprised within processor 12d. Preferably, processors 12b and 12c also include local APICs (not shown). For simplicity and clarity, the local APICs comprised in the processors 12a–d are referred to as local APICs 40 collectively. It is noted that the local APICs need not necessarily be comprised within the processors 12a–d, but rather may be external and coupled to the processors 12a–d.

The interrupt control logic 36 further comprises an I/O Advanced Programmable Interrupt Controller (IOAPIC) 42 coupled to the local APICs 40. The interrupt control logic 36 further comprises a master 8259A PIC 44a and a slave 8259A PIC 44b, referred to collectively as the 8259A 44.

The IOAPIC 42 and the 8259A 44 receive interrupt signals 38 from the interrupt sources in the system 10, such as the 8254 timer real-time clock (RTC) interrupt, and control the routing of the interrupt sources to the processors 12a–d. The various portions of the interrupt control logic 36 are described in detail in the Intel Multiprocessor Specification Version 1.4, August 1996, which is hereby incorporated by reference in its entirety as though fully set forth herein. Programming of the interrupt control logic 36 will be described in more detail with reference to the flowchart of FIG. 4 below.

Referring again to FIG. 4, the loader program 32 saves the state of the interrupt control logic 36 which was set by the host operating system 26, in step 134. Preferably, saving the state of the interrupt control logic 36 comprises saving the state of the local APICs 40, the state of the IOAPIC 42, and the state of the 8259A 44.

The loader program 32 programs the first processor local APIC LINT0 line 50 as a virtual wire to pass through interrupts from the 8259A 44, in step 136. Programming the local APIC 40a in this manner gives the BIOS 34 the appearance of a DOS environment. The loader program 32 programs redirection table 0 of the IOAPIC 42 to physical destination mode and programs the physical destination to be the ID of the local APIC 40a of the first processor 12a, in step 138. The loader program 32 programs redirection table 0 of the IOAPIC 42 to virtual wire mode such that the INTR line 46 from the master 8259A 44a passes through the IOAPIC 42, in step 140. Steps 136, 138, 140 and/or 146 (below) serve to program the interrupt control logic 36 to a real mode emulation state so that the real mode BIOS 34 INT13 code executes properly. The loader program 32 disables the real-time clock (RTC) interrupt 48 to prevent undesirable RTC events during real mode operation, in step 142.

As is well known in x86 programming, in real mode, the physical address generated by the processor when fetching an instruction is computed as the sum of an offset value and the Code Segment (CS) register shifted left 4 bits. However, in protected mode, the value of the CS register is used as a segment selector for indexing into the GDT to select a segment descriptor. The segment descriptor contains a base address which is added to the offset to produce a linear address. The linear address is then translated into a physical address by a paging unit, if paging is enabled.

The loader program 32 provides a mapping between the physical addresses generated by the first processor 12a in real mode and in protected mode, in step 144. This mapping may be referred to as a "tiled" mapping. That is, a 1:1 address mapping is provided such that when the first processor 12a is switched between real and protected mode the next instruction fetched after the instruction which effectuated the mode switch is the instruction in the next physical memory location after the instruction which effectuated the mode switch. Preferably, the loader program 32 provides this mapping for host operating systems 26 where paging is enabled. The loader program 32 programs the master 8259A 44a and slave 8259A 44b to support DOS interrupt request (IRQ) vectors, in step 146.

Figure 6:
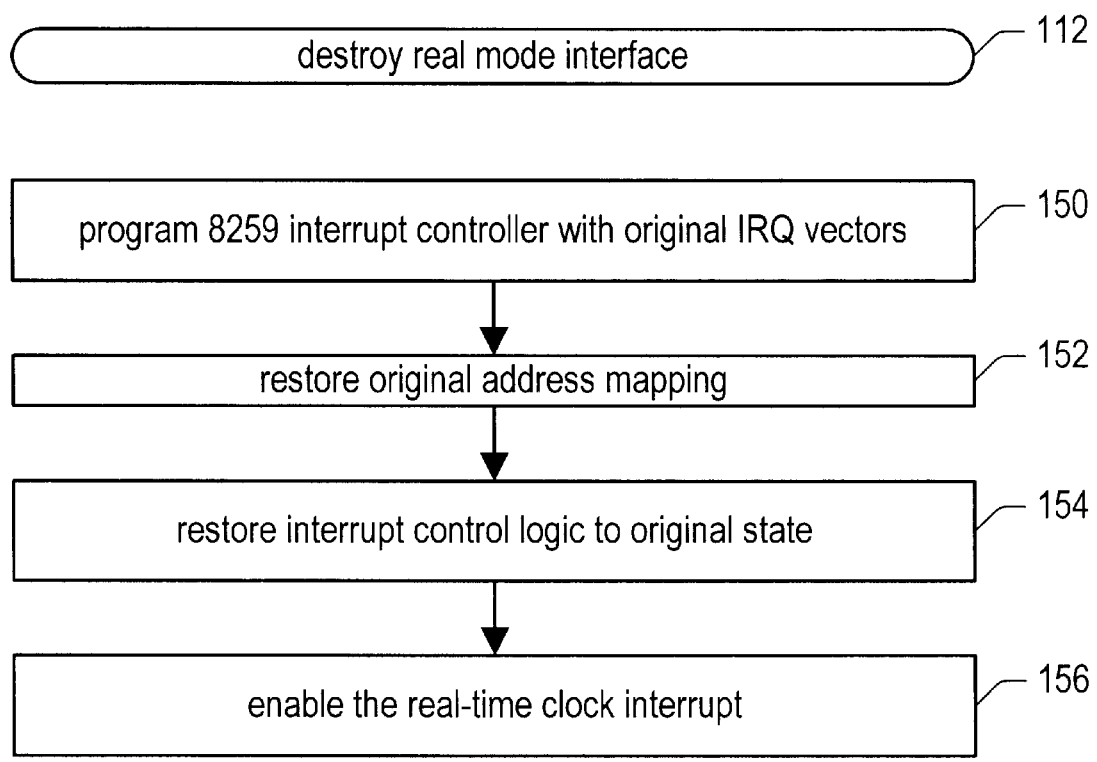
FIG. 6 is a flowchart illustrating in more detail the step of destroying the real mode interface of FIG. 2.

Referring now to FIG. 6, a flowchart illustrating in more detail step 112 of FIG. 2, destroying the real mode interface, is shown. The loader program 32 programs the master 8259A 44a and slave 8259A 44b to the original IRQ vectors set up by the host operating system 26, in step 150. The loader program 32 restores the original address mapping, in step 152. That is, the loader program 32 destroys the tiled mapping and restores the mapping to the mapping set by the host operating system 26. The loader program 32 restores the interrupt control logic 36 to its original state, i.e., the host operating system 26 programmed state, in step 154. Restoring the interrupt control logic 36 state includes restoring the state of the local APICs 40, the state of the IOAPIC 42, and the state of the 8259A 44. The loader program 32 enables the RTC, in step 156.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. In a computer system having a plurality of processors connected together by a processor bus, at least one of said processors being capable of executing instructions in a protected mode and a real mode, a system memory that is accessible by at least two of said plurality of processors, a storage device that stores information that is accessible by at least one of said plurality of processors, a method for loading executable instructions into said system memory using a first of said plurality of processors for execution by a second of said plurality of processors, said method comprising:

executing instructions with said first of said plurality of processors in said protected mode switching said first of said plurality of processors into said real mode;

reading at least a portion of said information from said storage device with said first of said plurality of processors after switching into said real mode;

loading said at least a portion of said information into said system memory with said first of said plurality of processors after reading said at least a portion of said information from said storage device;

executing instructions in said real mode to switch said first of said plurality of processors back into said protected mode after loading said at least a portion of said information into said system memory;

accessing said at least a portion of said information in said system memory with a second of said plurality of processors after said at least a portion of said information is loaded into said system memory by said first of said plurality of processors; and executing instructions corresponding to said portion of said information with said second of said plurality of processors after accessing said at least a portion of said information in said system memory with said second of said plurality of processors.

2. The method of claim 1, wherein said reading comprises issuing one or more Basic Input/Output System (BIOS) disk service requests.

3. The method of claim 1, further comprising:

reading a device driver from said storage device into said system memory after executing said instructions corresponding to said portion of said information with said second of said plurality of processors, wherein said device driver is operable to issue a request to said instructions executed with said second of said plurality of processors to control an input/output device comprised in said computer system.

4. The method of claim 1, further comprising:

reserving a portion of said system memory within a range of addresses of said system memory addressable by said first of said plurality of processors and a second of said plurality of processors in said real mode prior to said reading said at least a portion of said information from said storage device.

5. The method of claim 1, further comprising:

reading a second portion of said information from said storage device into said system memory prior to said reading said at least a portion of said information from said storage device; and executing instructions corresponding to said second portion of said information on said first of said plurality of processors after said reading said second portion;

wherein said second portion of said information is operable to perform said executing instructions with said first of said plurality of processors in said protected mode switching said first of said plurality of processors into said real mode, said loading said at least a portion of said information into said system memory with said first of said plurality of processors, and said executing instructions in said real mode to switch said first of said plurality of processors back into said protected mode.

6. The method of claim 1, wherein said second portion comprises a device driver.

7. The method of claim 1, further comprising:

programming interrupt control logic comprised in said computer system to a real mode emulation state.

8. The method of claim 1, further comprising:

programming a destination of interrupt control logic comprised in said computer system to said first of said plurality of processors.

9. The method of claim 1, further comprising:

providing a mapping of said system memory for switching said first of said plurality of processors between said protected mode and said real mode.

10. The method of claim 1, further comprising:

disabling a real-time clock interrupt comprised in said computer system to said first of said plurality of processors prior to said executing said instructions with said first of said plurality of processors in said protected mode switching said first of said plurality of processors into said real mode.

11. The method of claim 1, further comprising:

saving a state of said computer system while in said protected mode prior to said executing said instructions with said first of said plurality of processors in said protected mode switching said first of said plurality of processors into said real mode.

12. The method of claim 11, wherein said saving said state comprises saving a state of said first of said plurality of processors.

13. The method of claim 11, wherein said saving said state comprises saving a state of interrupt control logic comprised in said computer system.

14. The method of claim 11, further comprising:

restoring said state of said computer system after said reading said at least a portion of said information from said storage device with said first of said plurality of processors and prior to said executing said instructions in said real mode to switch said first of said plurality of processors back into said protected mode.

15. A computer system having a plurality of processors connected together by a processor bus, at least one of said processors being capable of executing instructions in a protected mode and a real mode, a system memory that is accessible by at least two of said plurality of processors and a storage device that stores information that is accessible by at least one of said plurality of processors, said computer system comprising:

a first of said plurality of processors, said first of said plurality of processors executing instructions in said protected mode switching said first of said plurality of processors into said real mode, then after switching into real mode said first of said plurality of processors reading at least a portion of said information from said storage device and loading said at least a portion of said information into said system memory, then after loading said at least a portion of said information into said system memory said first of said plurality of processors executing instructions in said real mode to switch back into said protected mode; and a second of said plurality of processors, said second of said plurality of processors accessing said at least a portion of said information from said system memory after said at least a portion of said information is loaded into said system memory by said first of said plurality of processors, said second of said plurality of processors then executing instructions corresponding to said portion of said information.

16. The system of claim 15, further comprising:

a Basic Input/Output System (BIOS), wherein said first of said plurality of processors is operable to execute said BIOS to read said at least a portion of said information from said storage device and load said at least a portion of said information into said system memory.

17. The system of claim 15, further comprising:

an input/output device;

wherein said first of said plurality of processors is operable to read a device driver from said storage device, load said device driver into said system memory, and execute said device driver;

wherein said device driver is operable to issue a request to said instructions corresponding to said portion of said information executing on said second of said plurality of processors to control said input/output device.

18. The system of claim 15, wherein said first of said plurality of processors is operable to read a second portion of said information from said storage device, load said second portion of said information into said system memory, and execute instructions corresponding to said second portion of said information;

wherein said second portion of said information is operable to switch said first of said plurality of processors into said real mode, read said at least a portion of said information from said storage device and load said at least a portion of said information into said system memory, and switch said first of said plurality of processors back into said protected mode.

19. The system of claim 15, further comprising:

interrupt control logic for receiving a plurality of interrupt requests and controlling forwarding of said plurality of interrupt requests to said plurality of processors, wherein said first of said plurality of processors is operable to program said interrupt control logic to a real mode emulation state.

20. A computer-readable storage medium comprising program instructions for execution in a computer system comprising a plurality of processors connected together by a processor bus, at least one of said processors being capable of executing instructions in a protected mode and a real mode, a system memory that is accessible by at least two of said plurality of processors, a storage device that stores information that is accessible by at least one of said plurality of processors, wherein said computer system is operable to load executable instructions into said system memory using a first of said plurality of processors for execution by a second of said plurality of processors, wherein said program instructions are operable to implement the steps of:

executing instruction with said first of said plurality of processors in said protected mode switching said first of said plurality of processors into said real mode;

reading at least a portion of said information from said storage device with said first of said plurality of processors after switching into said real mode;

loading said at least a portion of said information into said system memory with said first of said plurality of processors after reading said at least a portion of said information from said storage device;

executing instructions in said real mode to switch said first of said plurality of processors back into said protected mode after loading said at least a portion of said information into said system memory;

accessing said at least a portion of said information in said system memory with a second of said plurality of processors after said at least a portion of said information is loaded into said system memory by said first of said plurality of processors; and executing instructions corresponding to said portion of said information with said second of said plurality of processors after accessing said at least a portion of said information in said system memory with said second of said plurality of processors.

21. The medium of claim 20, wherein said reading comprises issuing one or more Basic Input/Output System (BIOS) disk service requests.

22. The medium of claim 20, wherein said program instructions are further operable to implement the step of:

reading a device driver from said storage device into said system memory after executing said instructions corresponding to said portion of said information with said second of said plurality of processors, wherein said device driver is operable to issue a request to said instructions executed with said second of said plurality of processors to control an input/output device comprised in said computer system.

23. The medium of claim 20, wherein said program instructions are further operable to implement the step of:

reserving a portion of said system memory within a range of addresses of said system memory addressable by said first of said plurality of processors and a second of said plurality of processors in said real mode prior to said reading said at least a portion of said information from said storage device.

24. The medium of claim 20, wherein said program instructions are further operable to implement the step of:

reading a second portion of said information from said storage device into said system memory prior to said reading said at least a portion of said information from said storage device; and executing instructions corresponding to said second portion of said information on said first of said plurality of processors after said reading said second portion;

wherein said second portion of said information is operable to perform said executing instructions with said first of said plurality of processors in said protected mode switching said first of said plurality of processors into said real mode, said loading said at least a portion of said information into said system memory with said first of said plurality of processors, and said executing instructions in said real mode to switch said first of said plurality of processors back into said protected mode.

25. The medium of claim 20, wherein said program instructions are further operable to implement the step of:

programming interrupt control logic comprised in said computer system to a real mode emulation state.

26. The medium of claim 20, wherein said program instructions are further operable to implement the step of:

programming a destination of interrupt control logic comprised in said computer system to said first of said plurality of processors.

27. The medium of claim 20, wherein said program instructions are further operable to implement the step of:

providing a mapping of said system memory for switching said first of said plurality of processors between said protected mode and said real mode.

28. The medium of claim 20, wherein said program instructions are further operable to implement the step of:

disabling a real-time clock interrupt comprised in said computer system to said first of said plurality of processors prior to said executing said instructions with said first of said plurality of processors in said protected mode switching said first of said plurality of processors into said real mode.

29. The medium of claim 20, wherein said program instructions are further operable to implement the step of:

saving a state of said computer system while in said protected mode prior to said executing said instructions with said first of said plurality of processors in said protected mode switching said first of said plurality of processors into said real mode.

* * * * *